United States Patent
Rapisarda

(10) Patent No.: US 6,974,841 B1
(45) Date of Patent: Dec. 13, 2005

(54) PET ANTI-AGING WELLNESS SUPPLEMENT

(75) Inventor: Carol Osborne Rapisarda, Chagrin Falls, OH (US)

(73) Assignee: Rapisarda Family Irrevocable Trust, Chagrin Falls, OH (US)

( * ) Notice: Subject to any disclaimer, the term of this patent is extended or adjusted under 35 U.S.C. 154(b) by 50 days.

(21) Appl. No.: 10/770,953

(22) Filed: Feb. 3, 2004

Related U.S. Application Data

(63) Continuation of application No. 10/259,147, filed on Sep. 27, 2002, now abandoned.

(51) Int. Cl.⁷ .............................................. A61K 47/00
(52) U.S. Cl. ...................................... 514/783; 514/276
(58) Field of Search ............................... 514/251, 276, 514/783; 424/442

(56) References Cited

U.S. PATENT DOCUMENTS

| | | | | |
|---|---|---|---|---|
| 2,959,520 | A | * | 11/1960 | Kawajiri ...................... 514/52 |
| 5,466,452 | A | * | 11/1995 | Whittle ....................... 424/750 |
| 6,147,054 | A | * | 11/2000 | De Paoli Ambrosi ......... 514/23 |
| 6,214,371 | B1 | * | 4/2001 | Kobayashi et al. ......... 424/438 |
| 6,413,545 | B1 | * | 7/2002 | Alviar et al. ............... 424/451 |

* cited by examiner

*Primary Examiner*—Robert P. Swiatek
(74) *Attorney, Agent, or Firm*—Pearne & Gordon LLP

(57) ABSTRACT

A health and nutrition supplement dosage for pets, particularly canine pets, consisting essentially of anti-oxidant vitamins, B complex vitamins, bioflavonoids, chelated minerals, digestive enzymes, herbs, nutrients, and essential fatty acids amino acids and hormones.

11 Claims, No Drawings

PET ANTI-AGING WELLNESS SUPPLEMENT

This application is a Continuation of application Ser. No. 10/259,147 filed Sep. 27, 2002, now abandoned.

This invention relates to a pet anti-aging wellness system providing in a natural treat formula for dogs and a dosage system for the formulation given according to body weight.

BACKGROUND OF THE INVENTION

People and pets are now living longer than ever before. Dog owners naturally want their dogs to live the longest, healthiest life possible. Dogs, like people, have specific nutritional needs. As the dog gets older, the aging process takes it toll. The dog tends to slow down mentally and physically.

Although the aging process is different for every animal (large and giant breeds tend to age faster than smaller ones), it generally begins at maturity, somewhere between one and two years of age. Most dogs become senior citizens at seven. Giant breeds are considered seniors at age five.

To determine whether or not a dog is old, its important to distinguish between chronological and biological age. Chronological age is merely the number of years a dog has lived while biological age is determined by how the dog looks, acts and feels. From an anti-aging standpoint the dogs biological age is more important that its chronological age. Longevity is attributed 70% to lifestyle and 30% to genetics. Up to 90% of diseases in dogs are due to the degenerative process associated with aging.

Balanced diets are essential, but alone they cannot provide a dog with optimal levels of nutrients his or her body needs. In fact, just to obtain adequate levels of vitamin E the dog would have to consume 5000 calories a day. Consuming this many calories is detrimental to the dogs health and could quickly lead to obesity and several other health-related problems. Also, taking vitamins once a day may not be sufficient to provide anti-aging benefits for the dog. Many vitamins are water-soluble and are diluted and secreted from the body fairly quickly.

BRIEF DESCRIPTION OF THE INVENTION

This invention provides an anti-aging and wellness supplement that is a unique combination of natural ingredients in a chewable tablet that will help promote a longer, healthier life for a dog.

The supplement contains rich amounts of antioxidants including vitamins A, C, and E along with the minerals selenium and zinc. A once a day dosage may not be sufficient to provide anti-aging benefits because of the water solubility of the vitamins. An optimal dosage should be given in the morning and again before bedtime. The morning formulation further includes green tea, ginseng glucosamine and MSM (methyl-sulfonyl-methane), all of which improves the dogs mood, mobility and energy levels. The nighttime formula contains essential fatty acids, digestive enzymes, colostrum and melatonin which prepares the dog for sleep and energizes its body cells.

An effective morning formulation for a 40–70 pound dog are two chewable tablets which, together, include the following ingredients in the amounts specified:

| Anti-Oxidant Vitamins | |
| --- | --- |
| Vitamin A (Palmitate, Alpha, Beta, Lutein, Lycopene) | 900.00 IU |
| Vitamin C (Ascorbic Acid) | 125.00 mg |
| Vitamin E (d-Alpha Tocopherols) | 25.00 IU |
| B Complex Vitamins | |
| Vitamin B-1 (Thiamine Hydrochloride) | 10.00 mg |
| Vitamin B-2 (Riboflavin Powder) | 4.13 mg |
| Vitamin B-3 (Niacin) | 7.50 mg |
| Vitamin B-3 (Niacinamide) | 100.00 mg |
| Vitamin Biotin | 66.00 mcg |
| Vitamin Folic Acid | 66.00 mcg |
| Vitamin B-12 (Cyanocobalamin) | 66.00 mcg |
| Vitamin B-5 (Calcium Pantothenate) | 20.00 mg |
| Vitamin B-6 (Pyridoxine HCL) | 3.30 mg |
| Inositol | 250.00 mcg |
| Bioflavonoids | |
| Lemon Bioflavonoids | 25.00 mg |
| Chelated Minerals | |
| Zinc Gluconate | 7.50 mg |
| Selenium Chelate | 35.00 mcg |
| Chromium Chelate | 100.00 mcg |
| Vanadyl Sulfate | 66.00 mcg |
| Calcium (Citrate/Malate) | 8.75 mg |
| Magnesium Oxide | 15.00 mg |
| Manganese Malate | 5.00 mg |
| Digestive Enzymes | |
| Digestive Enzyme Complex (full range) consisting of: | 10.00 mg |
| Protease | 60.00 Units |
| Amylase | 240.00 Units |
| Lipase | 10.00 Units |
| Cellulase | 2.00 Units |
| Lactase | 40.00 Units |
| Herbs | |
| Green Tea Extract (30% polyphenols) | 140.00 mg |
| Siberian Ginseng | 100.00 mg |
| Nutrients | |
| Glucosamine Sulfate Potassium | 500.00 mg |
| MSM | 250.00 mg |
| Coenzyme Q 10 | 10.00 mg |
| Alpha Lipoic Acid | 5.00 mg |
| Lutein | 1.00 mg |
| Essential Fatty Acids | |
| GLA (Borrge Seed Oil) | 40.00 mg |

An effective evening formulation for a 40–70 pound dog are two chewable tablets which, together, include the following ingredients in the amounts specified:

| Anti-Oxidant Vitamins | |
| --- | --- |
| Vitamin A (Palmitate, Beta, Alpha, Lutein, Lycopene) | 900.00 IU |
| Vitamin C (Ascorbic Acid) | 125.00 mg |
| Vitamin E (D-Alpha Tocopherols) | 25.00 IU |
| B Complex Vitamins | |
| Vitamin B-1 (Thiamine Hydrochloride) | 10.00 mg |
| Vitamin B-2 (Riboflavin Powder) | 4.13 mg |
| Vitamin B-3 (Niacin) | 7.50 mg |
| Vitamin B-3 (Niacinamide) | 40.00 mg |
| Vitamin Biotin | 66.00 mcg |
| Vitamin Folic Acid | 66.00 mcg |
| Vitamin B-12 (Cyanocobalamin) | 66.00 mcg |
| Vitamin B-5 (Calcium Pantothenate) | 20.00 mg |
| Vitamin B-6 (Pyridoxine HCL) | 3.30 mg |

-continued

| | |
|---|---|
| Choline | 10.00 mg |
| Inositol | 250.00 mcg |
| Bioflavonoids | |
| Lemon Bioflavonoids | 25.00 mg |
| Chelated Minerals | |
| Zinc Gluconate | 7.50 mg |
| Selenium Chelate | 35.00 mcg |
| Chromium Chelate | 100.00 mcg |
| Vanadyl Sulfate | 66.00 mcg |
| Calcium (Citrate/Malate) | 7.50 mg |
| Magnesium Oxide | 15.00 mg |
| Manganese Malate | 5.00 mg |
| Digestive Enzymes | |
| Digestive Enzyme Complex (full range) consisting of: | 10.00 mg |
| Protease | 60.00 Units |
| Amylase | 240.00 Units |
| Lipase | 10.00 Units |
| Cellulase | 2.00 Units |
| Lactase | 40.00 Units |
| Nutrients | |
| Colostrum | 5.00 mg |
| Whey Peptides | 50.00 mg |
| Melatonin | 0.75 mg |
| DHEA Sulfate | 5.00 mg |
| Amino Acids | |
| L-Glutamine | 250.00 mg |

The following ingredients in the formulation contribute the stated benefits:

Antioxidants Including Vitamins A, C and E, Along with the Minerals Selenium and Zinc and the Nutrients Alpha Lipoic Acid and Lutein and Coenzyme Q 10.

A pet's body naturally contains may antioxidants that work together, in a variety of ways to help protect and insure health. Antioxidant neutralize harmful compounds called free radicals. Free radicals are formed each time a dog takes a breath. Exposure to the suns ultraviolet rays, environmental toxins, pollution, heavy metals, stress, diet and drugs, including antibiotics, also contribute to their production. Billions of free radicals are formed in a dog's body each day. They cause Oxidative Stress, which damages the pet's body; in much the same way that oxygen causes iron to rust. Free radicals damage the dogs cells and can also adversely effect vital tissues, organs and even DNA, the dogs genetic material. These harmful changes accumulate and have been proven to decrease the quality and length of life. Antioxidant supplements can increase the pets healthy life span and slow the aging process by providing the body with additional defenses against free radicals and decreasing the resultant levels of oxidative damage. Oxidative damage has been associated with many of the leading age related degenerative diseases including cancer, heart disease, liver and kidney disorders as well as arthritis, diabetes, senility, cognitive dysfunction and canine Alzheimer's disease.

Vitamin A

Vitamin A is an essential nutrient that acts as an antioxidant. It is also necessary for good vision, proper bone development and healthy skin.

Vitamin C

Vitamin C is needed to regenerate and revitalize Vitamin E. It is also essential to normal collagen formation. Collagen is an integral part of the walls of the blood vessels and is part of the matrix of cartilage, tendons, ligaments, bones and skin.

Vitamin E

Vitamin E is needed to regenerate and revitalize Vitamin C. It is also important to help maintain the integrity of cell membranes, which is essential for them to function normally.

Selenium

Selenium is an essential mineral, which is incorporated into many vital enzymes in the body. Selenium also works with Vitamin E as an antioxidant to help protect against free radical oxidative damage.

Zinc

Zinc is an essential mineral and is a vital component of several biochemical and enzymatic reactions in the dog's body. In addition, zinc is needed to maintain the health and integrity of the skin and hair coat.

Lutein

Lutein is plant pigment, derived from marigolds, that functions as an Antioxidant. It has been shown to play an important role in maintaining vision, health of the eyes as well as its role in maintaining a normally functioning Immune System.

Colostrum

Colostrum is the first milk the dog receives from his (or her) mother. It provides newborn puppies with substances called antibodies, which are needed for protection from disease during the first few months of life. Colostrum is important to help maintain the health and normal functioning of the immune system, which is the body's natural defense against disease and infection.

Glucosamine

Glucosamine is an amino sugar made of molecules called Glucosaminolglycans or "GAGS". GAGS are found in almost every tissue of the body including joints, tendons, ligaments, cartilage, skin and blood vessels. Glucosamine is needed to maintain normal joint fluid. Joint fluid surrounds the joints providing them with important nutrients. It helps to lubricate and cushion the joints, acting like a shock absorber during movement and insulating the bones from friction. Glucosamine is necessary to maintain the overall health and integrity of cartilage, bones and joints. It may also enhance the dog's mobility and flexibility.

MSM (methyl-sulfonyl-methane)

A unique organic form of sulfur that has an important role in the maintenance of normal joints and acts together with Glucosamine to restore normal join function and integrity.

Manganese

A trace mineral needed for vital enzyme reactions and proper bone development. It plays a key role in supporting the bodied production of vital elements required to rebuild cartilage in damaged joints.

Chromium Picolinate & Vanadyl Sulfate

These nutrients improve blood sugar metabolism, blood lipid concentrations and reduce body fat. Together they act to increase the body's sensitivity to the hormone insulin which may reduce the risk of diabetes.

Green Tea

The Anti-oxidants in Green Tea may decrease the risk of heart disease and protect the blood vessels that nourish the heart and brain. The Epigallocatechin Gallate in green tea may also be cancer protective.

B-Complex Vitamins

These are critical cofactors necessary for energy production. They are essential to metabolize proteins, carbohydrates and fats. B-Complex Vitamins aid in the release of energy from foods and may help to reduce cholesterol and triglycerides in the blood.

Panax Ginseng

The root of this plant was used for centuries in Asia as a strengthening tonic that rejuvenates and revitalizes the body. It also maintains blood glucose levels, has a role in regulation of blood pressure, strengthens the cardiovascular system and boosts immunity.

L-Glutamine

L-Glutamine is the most abundant amino acid in the body. It is the major energy source for the cells that line the small intestine of the dog's digestive track. It helps to energize the body by aiding in the maintenance of normal digestive system function. L-Glutamine is a precursor to Glucosamine, which the body uses to produce Glucosaminolglycans, (GAGS), as well as purine nucleotides, which are constituents of the dogs genetic material, (DNA & RNA).

Digestive Enzymes

Digestive enzymes are important to maintain overall health. The body's production of enzymes naturally decreases with increasing age. Proper supplementation of enzymes can enhance the dog's ability to digest, absorb and utilize nutrients in his diet, which are essential for energy production and ultimately, for life itself.

Essential Fatty Acids: Linoleic Acid

Linoleic Acid is an essential fatty acid, which helps to maintain the health and normal function of the skin and hair coat. It is also necessary for the normal structure, function and integrity of the dog's heart and brain.

Senior pets on the formula may enjoy good health, boundless energy and re-attain the physical and mental attributes they enjoyed in their younger years. Most senior pets on the formula seem happier, enjoy a better mental outlook on life and once again become active members of the world in which they live.

Adult pets on the AM/PM formula may look forward to achieving optimal health, well being, quality and length of life. Dogs started on the formula at the onset of adulthood may enjoy an active healthy life to the fullest.

While the invention has been shown and described with respect to particular embodiments thereof, those embodiments are for the purpose of illustration rather than limitation, and other variations and modifications of the specific embodiments herein described will be apparent to those skilled in the art, all within the intended spirit and scope of the invention. Accordingly, the invention is not to be limited in scope and effect to the specific embodiments herein described, nor in any other way that is inconsistent with the extent to which the progress in the art has been advanced by the invention.

What is claimed is:

1. A health and nutrition supplement dosage for pets, particularly canine pets, consisting essentially of anti-oxidant vitamins, B complex vitamins, bioflavonoids, chelated minerals, digestive enzymes, herbs, nutrients, and essential fatty acids.

2. A health and nutritional supplement dosage for pets according to claim 1, wherein the dosage is in tablet form.

3. A health and nutritional supplement dosage for pets according to claim 1, wherein said anti-oxidant vitamins comprise vitamin A (palmitate, alpha, beta, lutein, lycopene), vitamin C (ascorbic acid), and vitamin E (D-alpha tocopherols); wherein said B complex vitamins comprise vitamin B-1 thiamine hydrochloride, vitamin B-2 riboflavin powder, vitamin B-3 niacin, vitamin B-3 niacinamide, vitamin biotin, vitamin folic acid, vitamin B-12 cyanocobalamin, vitamin B-5 calcium pantothenate, and vitamin B-6 pyridoxine HCL, inositol; wherein said bioflavonoids are lemon bioflavonoids; wherein said chelated minerals comprise zinc gluconate, selenium chelate, chromium chelate, vanadyl sulfate, calcium (citrate/malate), magnesium oxide, manganese malate; wherein said digestive enzymes complex comprise a full range enzyme complex; wherein said herbs comprise green tea extract (30% polyphenols) and Siberian ginseng: wherein said nutrients comprise Glucosamine sulfate potassium, MSM (methyl-sulfonyl-methane), CO Q 10, alpha lipoic acid, and lutein, and wherein said essential fatty acids comprises GLA (linoleic acid).

4. A health and nutrition supplement dosage for pets, particularly canine pets, consisting essentially of anti-oxidant vitamins, B complex vitamins, bioflavonoids, chelated minerals, digestive enzymes, nutrients and amino acids.

5. A health and nutritional supplement dosage for pets according to claim 4 wherein the dosage is in tablet form.

6. A health and nutritional supplement dosage for pets according to claim 4 wherein said anti-oxidant vitamins comprise vitamin A (palmitate, beta, alpha, lutein, lycopene), vitamin C (ascorbic acid), vitamin E (D-alpha tocopherols); wherein said B complex vitamins comprise vitamin B-1 thiamine hydrochloride, vitamin B-2 riboflavin powder, vitamin B-3 niacin, vitamin B-3 niacinamide, vitamin biotin, vitamin folic acid, vitamin B-12 cyanocobalamin, vitamin B-5 calcium pantothenate, vitamin B-6 pyridoxine HCL, choline, inositol; wherein said bioflavonoids comprise lemon bioflavonoids; wherein said chelated minerals comprise zinc gluconate, selenium chelate, chromium chelate, vanadyl sulfate, calcium (citrate/malate), magnesium oxide, manganese malate; wherein said digestive enzymes comprise a full range of digestive enzyme complex; wherein said nutrients are colostrum, whey peptides, melatonin, and DHEA sulfate; and wherein said amino acids is L glutamine.

7. A health and nutrition supplement dosage for pets according to claim 6 wherein the dosage is in tablet form.

8. A health and nutrition supplement morning dosage for pets, particularly canine pets, consisting essentially of:

| Anti-Oxidant Vitamins | |
|---|---|
| Vitamin A (Palmitate, Alpha, Beta, Lutein, Lycopene) | 900.00 IU |
| Vitamin C (Ascorbic Acid) | 125.00 mg |
| Vitamin E (d-Alpha Tocopherols) | 25.00 IU |
| B Complex Vitamins | |
| Vitamin B-1 Thiamine Hydrochloride | 10.00 mg |
| Vitamin B-2 Riboflavin Powder | 4.13 mg |
| Vitamin B-3 Niacin | 7.50 mg |
| Vitamin B-3 Niacinamide | 100.00 mg |
| Vitamin Biotin | 66.00 mcg |
| Vitamin Folic Acid | 66.00 mcg |
| Vitamin B-12 Cyanocobalamin | 66.00 mcg |
| Vitamin B-5 Calcium Pantothenate | 20.00 mg |
| Vitamin B-6 Pyridoxine HCL | 3.30 mg |
| Inositol | 250.00 mcg |

-continued

| Bioflavonoids | | |
|---|---|---|
| Lemon Bioflavonoids | 25.00 | mg |
| Chelated Minerals | | |
| Zinc Gluconate | 7.50 | mg |
| Selenium Chelate | 35.00 | mcg |
| Chromium Chelate | 100.00 | mcg |
| Vanadyl Sulfate | 66.00 | mcg |
| Calcium (Citrate/Malate) | 8.75 | mg |
| Magnesium Oxide | 15.00 | mg |
| Manganese Malate | 5.00 | mg |
| Digestive Enzymes | | |
| Digestive Enzyme Complex (full range) | 10.00 | mg |
| Herbs | | |
| Green Tea Extract (30% polyphenols) | 140.00 | mg |
| Siberian Ginseng | 100.00 | mg |
| Nutrients | | |
| Glucosamine Sulfate Potassium | 500.00 | mg |
| MSM | 250.00 | mg |
| CO Q 10 | 10.00 | mg |
| Alpha Lipoic Acid | 5.00 | mg |
| Lutein | 1.00 | mg |
| Essential Fatty Acids | | |
| GLA | 40.00 | mg. |

9. A health and nutrition supplement morning dosage according to claim 8 wherein the dosage is in the form of two tablets.

10. A health and nutrition supplement evening dosage for pets, particularly canine pets, consisting essentially of:

| Anti-Oxidant Vitamins | | |
|---|---|---|
| Vitamin A (Palmitate, Beta, Alpha, Lutein, Lycopene) | 900.00 | IU |
| Vitamin C (Ascorbic Acid) | 125.00 | mg |
| Vitamin E (d-Alpha Tocopherols) | 25.00 | IU |

-continued

| B Complex Vitamins | | |
|---|---|---|
| Vitamin B-1 Thiamine Hydrochloride | 10.00 | mg |
| Vitamin B-2 Riboflavin Powder | 4.13 | mg |
| Vitamin B-3 Niacin | 7.50 | mg |
| Vitamin B-3 Niacinamide | 40.00 | mg |
| Vitamin Biotin | 66.00 | mcg |
| Vitamin Folic Acid | 66.00 | mcg |
| Vitamin B-12 Cyanocobalamin | 66.00 | mcg |
| Vitamin B-5 Calcium Pantothenate | 20.00 | mg |
| Vitamin B-6 Pyridoxine HCL | 3.30 | mg |
| Choline | 10.00 | mg |
| Inositol | 250.00 | mcg |
| Bioflavonoids | | |
| Lemon Bioflavonoids | 25.00 | mg |
| Chelated Minerals | | |
| Zinc Gluconate | 7.50 | mg |
| Selenium Chelate | 35.00 | mcg |
| Chromium Chelate | 100.00 | mcg |
| Vanadyl Sulfate | 66.00 | mcg |
| Calcium (Citrate/Malate) | 7.50 | mg |
| Magnesium Oxide | 15.00 | mg |
| Manganese Malate | 5.00 | mg |
| Digestive Enzymes | | |
| Digestive Enzyme Complex (full range) | 10.00 | mg |
| Nutrients | | |
| Colostrum | 5.00 | mg |
| Whey Peptide | 50.00 | mg |
| Hormones | | |
| Melatonin | 0.75 | mg |
| DHEA Sulfate | 5.00 | mg |
| Amino Acids | | |
| L-Glutamine | 250.00 | mg. |

11. A health and nutrition supplement morning dosage according to claim 10 wherein the dosage is in the form of two tablets.

\* \* \* \* \*